Oct. 15, 1957    W. CHRISTENSEN ET AL    2,809,571
IDENTIFICATION CAMERA
Filed March 17, 1953    2 Sheets-Sheet 1
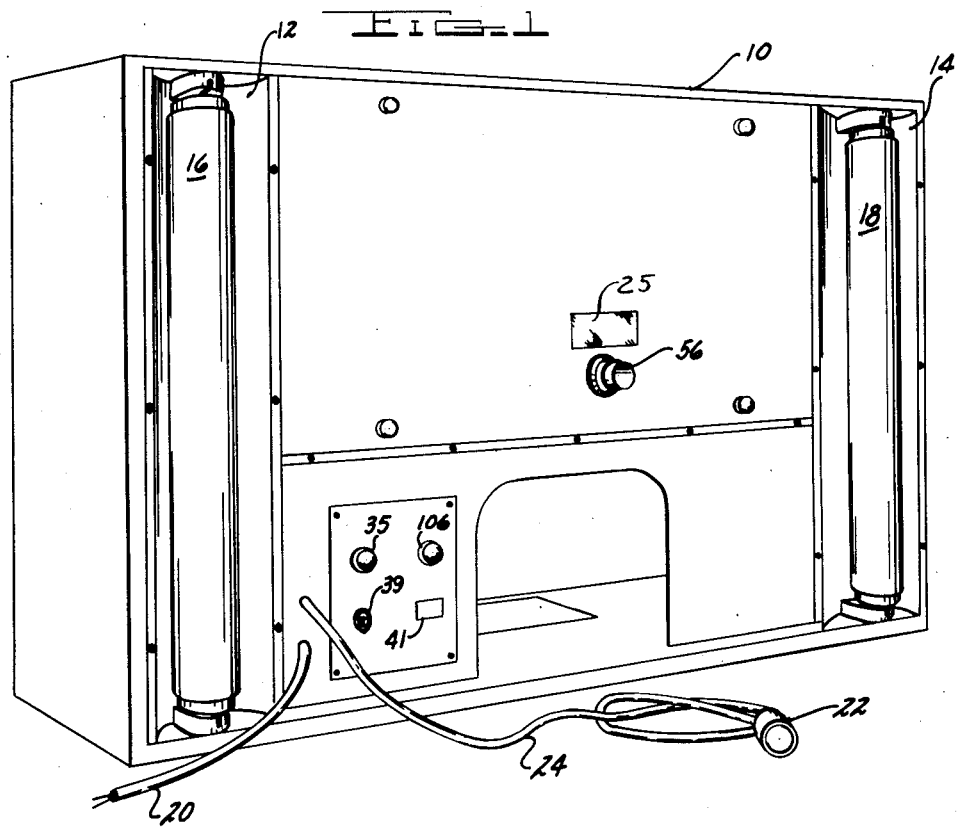
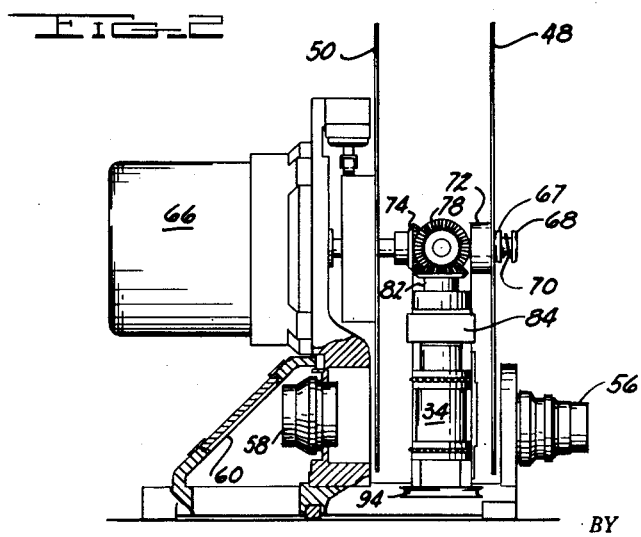
INVENTORS
WILLIAM CHRISTENSEN
BY ROBERT M. LANSPEARY
Smith and Olsen
ATTORNEYS

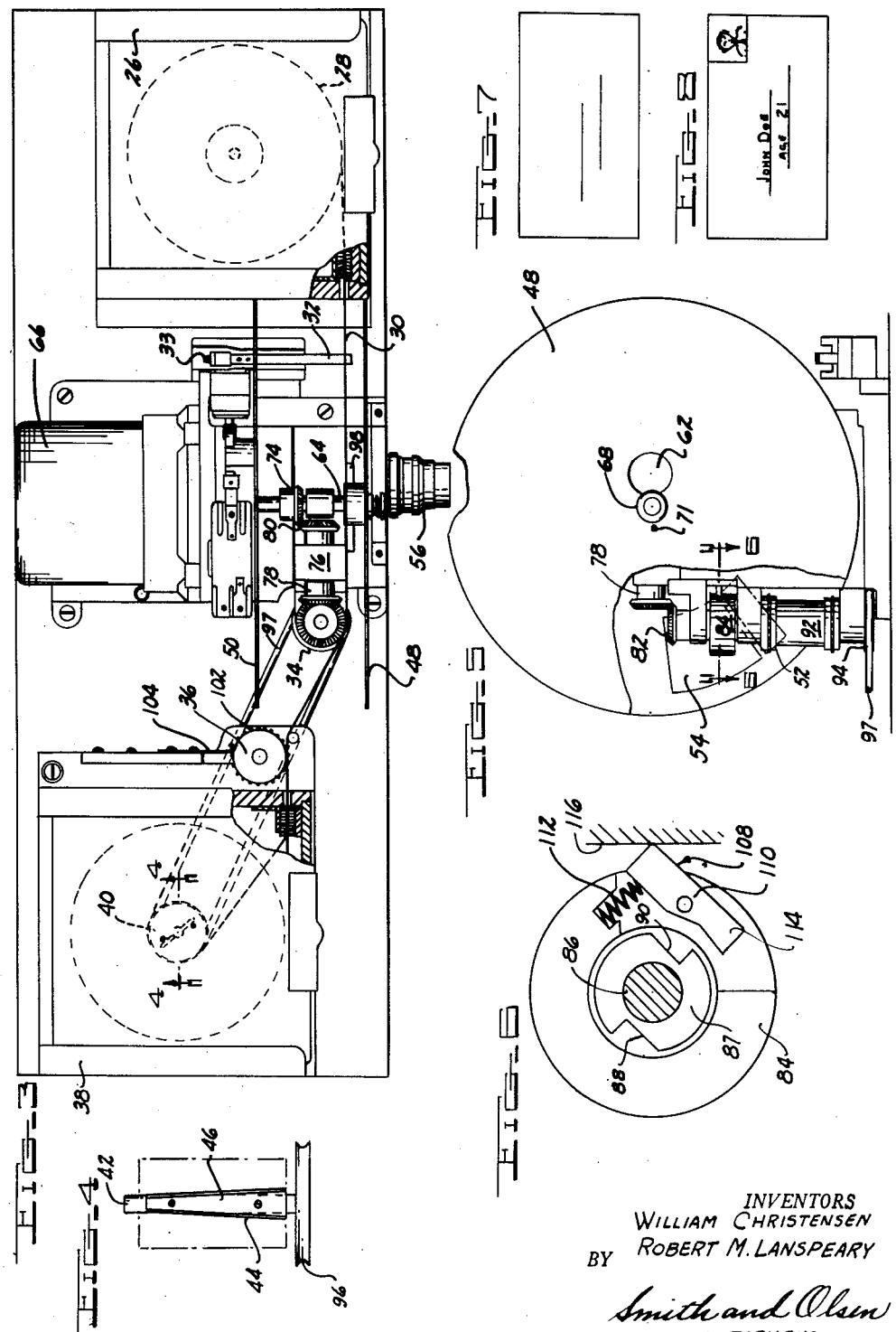

United States Patent Office 2,809,571
Patented Oct. 15, 1957

2,809,571

IDENTIFICATION CAMERA

William Christensen and Robert M. Lanspeary, Detroit, Mich., assignors to John Hartman, Dearborn, Mich.

Application March 17, 1953, Serial No. 342,898

5 Claims. (Cl. 95—31)

The present invention relates to improvements in an identification camera, and more particularly to an identification camera which will take a large number of composite photographs in rapid succession.

Identification cameras of the general type provided by applicant have been developed in the past. Such cameras may be used, for instance, to photograph an individual and at substantially the same time photograph a filled in data card so that the result is a data or identification card having a picture of the individual thereon. This is accomplished by having the data card at one position, the person to be photographed at another position, and imposing the images on a film through separate lenses.

None of the identification camers in the past have been successful in obtaining wide-spread commercial acceptance. We are thoroughly familiar with the identification camera field and have contacted many people who have a use for and have expressed an interest in such a camera. However, prior to the present invention no identification camera has been developed which could be sold at a practical cost. One identification camera which is in limited use is utilized on a rental basis because the cost of manufacture is so excessive that the sale of the same is not practical. Further, all prior identification cameras known to us have provided various problems which have been solved in the camera which is the subject of the present invention. For instance, the prior film advance mechanisms are not efficient. In some instances many photographs are supposedly taken while the film bunches up within the camera, the operator being unaware of the fact that the film is not advancing properly. It will be readily seen that this can cause a great inconvenience, especially in a situation such as a college registration where several hundred students must be processed with a minimum of confusion and in a minimum amount of time.

We have contacted many interested parties. The identification card having a photograph thereon has great possibilities for all types of identification such as credit cards, security agencies, driver's licenses, and college registrations. The camera of the present invention was recently demonstrated to one large college during a registration and was so successful that the college purchased a camera for its own use.

It is a primary object of the present invention to provide an identification camera which will take a large number of composite pictures within a minimum time and which may be operated without difficulty.

It is another object of the present invention to provide an identification camera which has a positive and efficient indexing or advance mechanism.

It is another object of the present invention to provide an identification camera which will quickly notify the operator if the film is not being indexed properly.

It is a further object of the present invention to provide an identification camera which is simple and efficient in construction and which may be produced at a relatively low cost.

The camera of the present invention utilizes large lengths of film such as Eastman 35 mm. in 50 or 100 foot rolls. A 100 foot roll will produce about 800 exposures. The camera operates in a cycle. A data card is positioned in the camera, and the person to be photographed is placed in front of the camera. During the first half of the operating cycle the shutter for the front lens is actuated to expose the emulsion side of the film and impress the image of the person on the film, and then the shutter for the rear lens is actuated to permit the projected image of the data card to fall on the back of the film, the emulsion being exposed to the data card image through the transparent film. The second half of the cycle comprises advancing the film the correct distance so that the next frame of film is in position for taking the next picture.

Other objects of this invention will appear in the following description and appended claims, reference being had to the accompanying drawings forming a part of this specification wherein like reference characters designate corresponding parts in the several views.

In the drawings:

Fig. 1 is a perspective view of an identification camera embodying the present invention.

Fig. 2 is a side sectional elevation of the internal mechanism of the camera.

Fig. 3 is a top plan view of the camera with the top plate removed to show the internal construction.

Fig. 4 is a sectional elevation taken along the line 4—4 in the direction of the arrows, Fig. 3.

Fig. 5 is a front elevation of the shutter mechanism of the camera with a portion broken away.

Fig. 6 is a plan view showing a portion of the indexing mechanism of the present invention.

Fig. 7 is a view showing the data card used with the camera of the present invention.

Fig. 8 is a view of the data card of Fig. 7 after it has been executed and exposed.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring particularly to Fig. 1 of the drawings, the camera comprises a lightweight plastic or metal housing 10. A pair of parabolic reflectors 12 and 14 are located one adjacent each end of the housing. Gaseous discharge tubes 16 and 18 are positioned in sockets adjacent each of the reflectors. The use of gaseous discharge tubes results in producing the necessary light at low temperatures so that the subjects being photographed do not become uncomfortable, and so that the equipment does not overheat when the camera is in use for long periods of time. A lead wire 20 is provided for connecting the unit to a source of electricity such as the conventional electrical outlet in buildings. The operator's switch is indicated at 22 and is connected to the camera through the cord 24. The cord 24 is of a length which equals the proper distance from the subject to the lens so that the positioning of the subject may be accomplished rapidly by using the cord. This eliminates elaborate measuring procedure. Also, a mirror 25 is provided above the lens 56. When the person being photographed can see his eyes in the mirror, he is directly in front of the lens.

Referring now to Figs. 3–5, a raw film magazine is provided at 26 to accommodate a spool 28 of raw film. The film 30 extends over the film reload indicator 32, engages the advance sprocket 34 and the advance indicating idler sprocket 36, and is threaded into the take-up magazine 38. Thus, as pictures are taken, the film is advanced from the magazine 26 to the take-up spool 40. The take-up spool holder is shown in detail in Fig. 4 of the drawings. The take-up shaft 42 is provided with knife edges 44 and 46. These knife edges engage the sidewall of the central hole in the usual wooden spool which is provided. Thus, it does not matter if the hole size in the spool varies, since the knife edges will compensate for such variations.

The film reload indicator 32 is a resilient metal finger which normally engages a contact point 33. When the film 30 is placed atop the finger 32 the engagement with the contact point 33 is broken. After the film is entirely used the finger 32 again engages the contact point 33 and a circuit is closed to the reload light 35. When the reload light 35 is on, the operator knows that it is time to reload the camera. A power switch is shown at 39 and an exposure counter at 41.

A front shutter disc 48 and a rear shutter disc 50 are positioned in substantially parallel spaced-apart relation. The front shutter disc has an opening 52 therein which is shown in phantom in Fig. 5 since the portion of disc 48 in which opening 52 is located has been broken away. The rear shutter disc is provided with the opening 54. The image of the person being photographed is exposed to the film as the opening 52 passes behind the front lens 56. The card is exposed through the back of the film when the opening 54 in the rear shutter disc 50 passes in front of the rear lens 58 (Fig. 2). The identification or data card is placed in a preselected position on the flat bottom of the camera assembly and its image is transferred from the mirror 60 through the lens 58 and the opening 54 in the rear shutter disc 50, through the back of the film, and is impressed on the film emulsion. The front shutter 48 has an enlarged hole 62 with a slot extending sidewise therefrom. The power shaft 64 extends from an electric motor 66 and has a pair of retainers 67 and 68 on the front end thereof between which is disposed a coil spring 70. A nub or pin 71 extends from the hub 72 of the power shaft 64 through a hole in the shutter disc 48 to provide a positive mechanical connection. Thus, the disc may be removed by merely moving the disc 48 away from the pin 71 and moving the enlarged hole 62 in line with the retainer 67. The disc may then be moved forward away from the camera mechanism. To replace the disc 48, it is merely necessary to insert the large hole 62 over the retainers 67 and 68, and move the same sidewise until the narrow slot is engaged between the retainer 66 and the hub 72 and the pin 71 falls into the corresponding hole in the disc. This is a vast improvement over mechanisms such as those that screw into position since there is no danger of thread-stripping, misplacing screws, etc. The front shutter disc may be removed and inserted in a minimum of time and effort as film is replaced.

The driving mechanism of the camera consists of the electric motor 66 which has the power shaft 64 extending therefrom. A bevel gear 74 is affixed to the power shaft 64 and rotates therewith. The rear shutter disc 50 and the front shutter disc 48 also rotate with the power shaft. A power transfer shaft is disposed through the bearing block 76 and has the bevel gears 78 and 80 provided on the ends thereof. The gear 80 is in mesh with the gear 74 on the power shaft 64. Thus, as the power shaft 64 is turned by the electric motor 66, the gears 78 and 80 will also be rotated. Disposed in engagement with the gear 78 is the gear 82 which is rigidly affixed to the housing 84. The housing 84 turns with each revolution of the gear 82. Disposed within the housing 84 is one end of the advance shaft 86 which has a cam rotor 87 thereon. The cam rotor 87 has two cam notches 88 and 90 therein. Rigidly affixed to the bottom of the advance shaft are the advance sprocket 34 and the drive pulley 94. The drive pulley 94 is operatively coupled with a pulley 96 located at the bottom of the take-up shaft 42 through a belt 97.

The operation of the camera of the present invention is as follows:

The front shutter disc 48 is removed and film is threaded from the magazine bin 26, through the mask 98, over the advance sprocket 34, over the idler sprocket 36 and onto the take-up spool 40. The teeth 102 of the idler sprocket 100 are engaged by a contact finger 104, and the contact finger 104 is electrically coupled with the indicator light 106 on the front of the camera. The indicating light and accompanying mechanism will be discussed in detail at a later point.

As previously explained, the camera is cyclic in operation. The cycle is divided into two components, film exposure and film advance. To start the cycle, the electric hold-in switch 22 is actuated and this starts the electric motor 66. During the first half of the operating cycle, the opening 52 in the front shutter disc is passed behind the front lens 56 to impress the image of the person onto the film. The opening 54 in the rear shutter 50 then passes in front of the rear lens 58 (Fig. 2), and the image of the card is passed from the mirror 60 through the lens 58 onto the film through the rear side thereof. It will be noted that the opening 54 is larger than the opening 52 since the light directed onto the data card is less than the light directed onto the person being photographed.

During the first half of the cycle when the shutter discs are rotated, the film advance mechanism is not actuated due to the construction particularly shown in Fig. 6 of the drawings. During the first half of the cycle, the gear 82 is being rotated through the gear train from the power shaft 64. The housing 84 is also being rotated because it is pinned to the gear 82. However, the housing 84 carries a pawl 108 which is pivotally connected to the housing by the pin 110. A coil spring 112 is disposed between the pawl 108 and a spring pocket in the housing 84, and this spring tends to move the pawl finger 114 toward the axis of rotation of the housing and into engagement with one of the cam notches 88 and 90. In this position, any rotary motion of the housing 84 is transferred through the pawl 108 to the advance shaft 86. As the housing revolves, with the pawl in engagement with one of the cam notches, the outboard end of the pawl circumscribes an arc outside the housing.

During the first half of the cycle, the outboard end of the pawl 108 engages a kick-off plate 116. As the housing 84 continues to turn, the pawl finger 114 will pivot about the pin 110 away from the cams 88 and 90 and compress the spring 112 as shown in Fig. 6. Thus there is no engagement between the housing 84 and the advance shaft 86, and the housing 84 will rotate relative to the advance shaft 86. During this portion of the cycle, the openings in the front and rear shutter discs are being moved across the respective lenses to take the composite picture. Although the motor shaft 64 and the shutter discs 48 and 50 are rotating, the advance sprocket 34 and take-up spool 40 are not being rotated because of the relative movement of the housing 84 with respect to the advance shaft 86.

During the second half of the cycle, the rotation is transmitted from the motor 66 through the gear train to the housing 84 and as the pawl clears the striker plate 116, the spring 112 forces the pawl finger 114 into one of the cam notches 88 or 90. Thus, the rotary motion is transmitted from the housing 84 to the shaft 86 and consequently to the advance sprocket 92 and the drive pulley 94. The rotary motion is transmitted from the drive pulley 94 through the belt 97 to the pulley 96 on the take-up shaft 42. In this manner the film is advanced past the advance sprocket 34 and onto the take-up spool 40 during the second half of the cycle.

The shaft 86 makes one-half turn during the operational cycle while the housing 84 makes one complete turn. The photograph is taken during the first half of the cycle, and the film is advanced only during the second half of the cycle. As the motor stops, the housing 84 stops at a position where the pawl 108 engages the kickoff plate 116. The cam finger 114 is out of engagement with the cam rotor, and the shaft 86 may be "free wheeled" to facilitate film loading.

In any camera that progressively exposes a large number of images, there is always the question as to whether or not the film is advancing after each exposure. Failure may be attributed to a number of causes such as improper loading, defective film or camera failure.

The camera of the present invention gives a positive indication as to whether or not the film is properly advancing. The indicating mechanism includes the idler sprocket 36 which engages the film 30 before it enters the magazine 38 onto the take-up spool 40 (Fig. 3). The metal contact finger 104 engages the teeth 102 on the idler sprocket 36, and the contact finger 104 is electrically coupled with the indicator light 106 (Fig. 1). As the film is advanced the indicator light will flash eight times in quick succession as the teeth 102 engage the finger 104. If the film bunches up at the entrance of the magazine 38 then the idler sprocket 36 will not be rotated and the indicator light 106 will not flash. This is noticed immediately by the operator and the particular defect may be cured without wasting further time.

From the foregoing description it will be seen that we have invented a novel and efficient identification camera which is characterized by a simple and positive driving mechanism. Cameras embodying the present invention have been run for long periods without difficulty. The entire construction is light and may be carried the same as a traveling bag.

Having thus described our invention, we claim:

1. In a photographic camera, having separate lenses with an individual shutter for each lens, means for guiding photographically sensitive material between said lenses, and means for simultaneously operating said shutters, an operating mechanism for moving said sensitive material including an advance member having a cam notch thereon, and means for correlating the movement of said sensitive material and said shutters comprising a revolving housing with a pivotal pawl therein and means for controlling said pawl so that it will selectively engage the cam notch in said advance member, the advance member thus being moved during only a portion of one complete revolution of the housing.

2. In a photographic camera, having separate lenses with an individual shutter for each lens, and means for guiding photographically sensitive material between said lenses, a power source, coupling means directly coupled with said power source for effecting a direct gear drive to simultaneously operate said shutters, a housing in direct gear drive relation with said coupling means, an advance shaft disposed with one end within said housing, means for selectively engaging said advance shaft with said housing so that said advance shaft will move during only a portion of one complete revolution of the housing, a take-up spool, and means operatively coupling said advance shaft with said take-up spool.

3. In a photographic camera, having separate lenses with an individual shutter for each lens, and means for guiding photographically sensitive material between said lenses, a power source, coupling means directly coupled with said power source for effecting a direct gear drive to simultaneously operate said shutters, a housing in direct gear drive relation with said coupling means, an advance shaft having a cam rotor thereon with a plurality of cam notches therein, said cam rotor being disposed concentrically within said housing, a pivotal pawl disposed in said housing, a spring disposed between said housing and the outboard end of said pawl so that said outboard end tends to be moved out of the housing in its normal position and the inboard portion of said pawl tends to engage one of the notches in said cam rotor, and a striker plate adjacent said housing which is adapted to obstruct the outboard end of said pawl during a portion of the rotation of the housing to pivot the pawl against the spring and disengage the inboard end of the pawl from the notches in said cam rotor.

4. In a photographic camera, having separate lenses with an individual shutter for each lens, and means for guiding photographically sensitive material between said lenses, a power source, coupling means directly coupled with said power source for effecting a direct gear drive to simultaneously operate said shutters, a housing in direct gear drive relation with said coupling means, an advance shaft having a cam rotor thereon with a plurality of cam notches therein, said cam rotor being disposed concentrically within said housing, a pivotal pawl disposed in said housing, a spring disposed between said housing and the outboard end of said pawl so that said outboard end tends to be moved out of the housing in its normal position and the inboard portion of said pawl tends to engage one of the notches in said cam rotor, a striker plate adjacent said housing which is adapted to obstruct the outboard end of said pawl during a portion of the rotation of the housing to pivot the pawl against the spring and disengage the inboard end of the pawl from the notches in said cam rotor, a take-up spool, and means operatively coupling said advance shaft with said take-up spool.

5. In a camera for use with photographically sensitive material, separate lenses, an individual shutter for each lens, advance means for moving said photographically sensitive material, a take-up spool, an idler sprocket disposed between said advance means and said take-up spool, said sprocket having teeth along its upper and lower edge adapted to seat in holes bordering the photographically sensitive material, a finger of conductive material disposed in the path of said teeth, and an indicator light electrically coupled with said finger to indicate the contact of said finger with successive teeth in said idler sprocket as said sensitive material is advanced past said idler sprocket.

References Cited in the file of this patent

UNITED STATES PATENTS

| | | |
|---|---|---|
| 619,309 | Jackson | Feb. 14, 1889 |
| 1,150,543 | Savage | Aug. 17, 1915 |
| 1,205,085 | DeVine | Nov. 14, 1916 |
| 1,208,617 | Montague | Dec. 12, 1916 |
| 1,645,590 | Ernst | Oct. 18, 1927 |
| 1,693,876 | Unruh | Dec. 4, 1928 |
| 2,345,999 | Babcock | Apr. 4, 1944 |
| 2,347,749 | Monroe | May 2, 1944 |
| 2,475,898 | Jacobson | July 12, 1949 |
| 2,529,896 | Askren | Nov. 14, 1950 |
| 2,541,016 | Allen | Feb. 13, 1951 |
| 2,632,369 | Estes | Mar. 24, 1953 |